(12) United States Patent
Wittke et al.

(10) Patent No.: US 6,952,474 B2
(45) Date of Patent: Oct. 4, 2005

(54) PHONE PRIVACY AND UNOBTRUSIVENESS VIA VOICE CANCELLATION

(76) Inventors: Edward R. Wittke, 54 Coppergate La., Warwick, NY (US) 10990; Melissa A. Wittke, 54 Coppergate La., Warwick, NY (US) 10990

( * ) Notice: Subject to any disclaimer, the term of this patent is extended or adjusted under 35 U.S.C. 154(b) by 568 days.

(21) Appl. No.: 09/808,853

(22) Filed: Mar. 15, 2001

(65) Prior Publication Data

US 2002/0131581 A1 Sep. 19, 2002

(51) Int. Cl.$^7$ .......................... H04M 1/00; H04M 9/00; H04M 9/08
(52) U.S. Cl. .............................. 379/406.02; 379/406.01
(58) Field of Search ...................... 379/406.01–406.09, 379/392.01, 444, 416; 381/13, 300, 387, 73.1, 71.1, 71.8–71.9, 94.1, 94.7, 66

(56) References Cited

U.S. PATENT DOCUMENTS

| | | | |
|---|---|---|---|
| 4,006,308 A | * | 2/1977 | Ponsgen ..................... 381/387 |
| 5,526,421 A | * | 6/1996 | Berger et al. .......... 379/406.06 |
| 5,555,310 A | * | 9/1996 | Minami et al. ............... 381/17 |
| 5,625,684 A | * | 4/1997 | Matouk et al. ......... 379/392.01 |

* cited by examiner

Primary Examiner—Curtis Kuntz
Assistant Examiner—Alexander Jamal
(74) Attorney, Agent, or Firm—Joseph B. Taphorn

(57) ABSTRACT

A method and apparatus for transmitting a clear voice signal while effectuating speech privacy and unobtrusiveness through adaptive signal processing; includes a voice input microphone, an electrical line for transmitting representations of the received voice signal from the microphone and having a modulator in it, actuators or speakers spherically disposed about the microphone for creating sound canceling the ambient spatial transmission of the voice inputted into the microphone, an adaptive signal processor for receiving from the transmission line before the modulator the representations of the received voice signal from the microphone and for providing appropriate output to the actuators or speakers for them to create sound canceling the spatial transmission of the microphone inputted voice and to the modulator to remove from the transmission line downstream of the modulator the speaker sounds signals picked up by the voice input microphone. Far-field sensors spherically arranged about the speakers detect how well the speakers reduce the voice spatial transmission and input the adaptive signal processor accordingly. The signal processor contains an adaptive signal processing algorithm which adjusts the signal characteristics for each individual cancellation actuator over time. Since the voice is cancelled in close proximity to the mouth piece of the phone when the invention is incorporated in a phone, the signal processor is used to introduce into the ear-piece of the phone the person's voice in order for the person to hear his or her own voice.

20 Claims, 3 Drawing Sheets

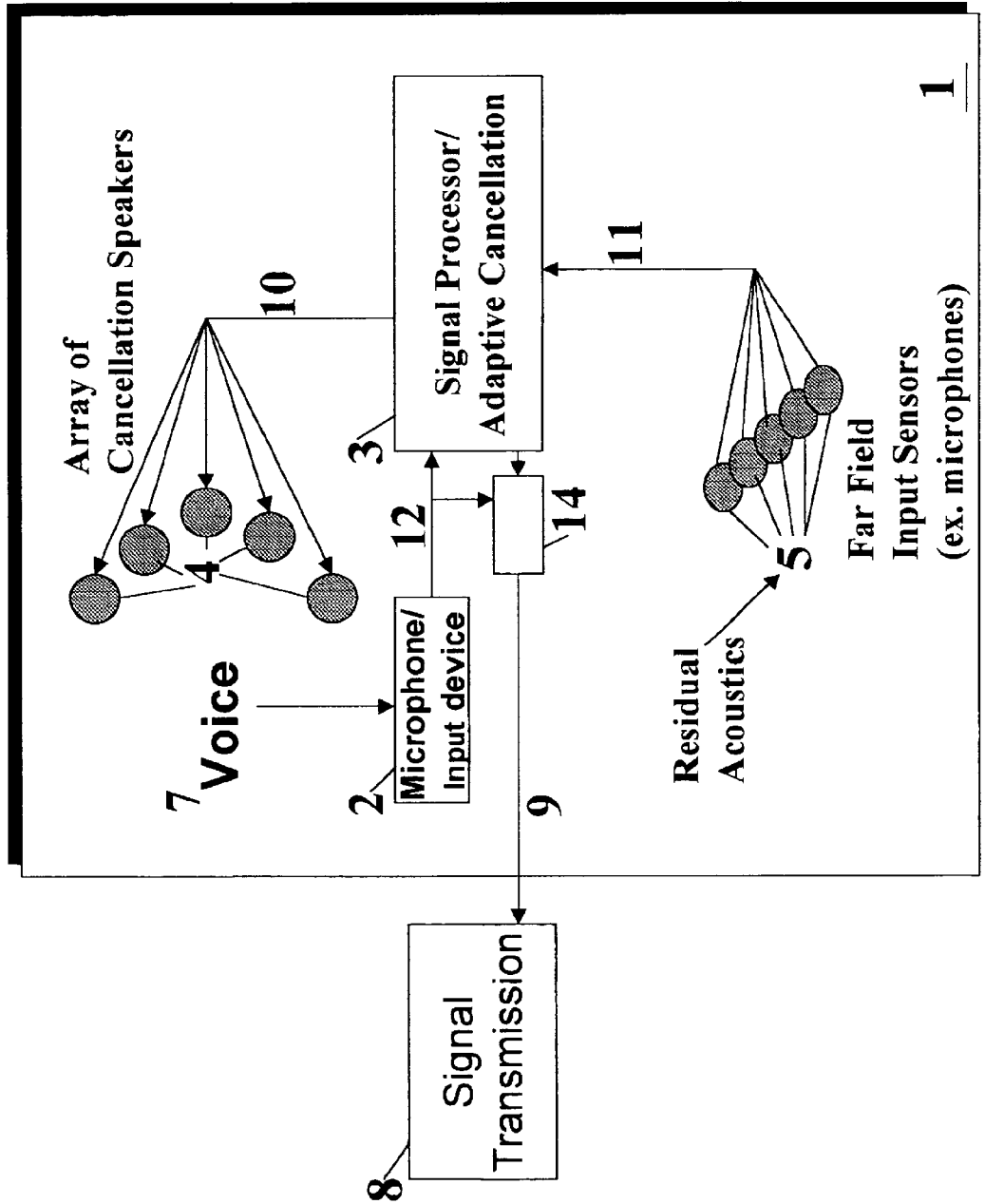

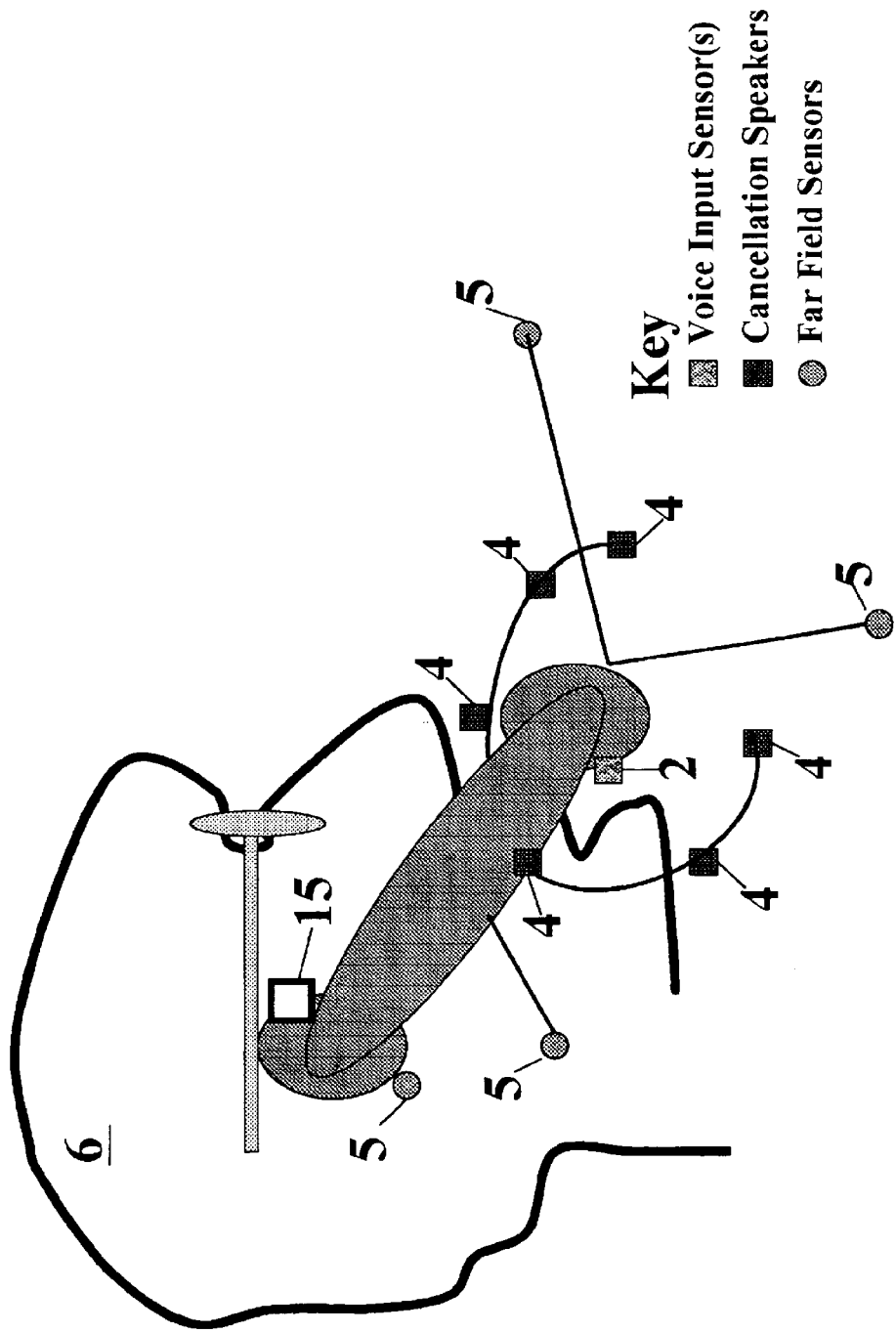

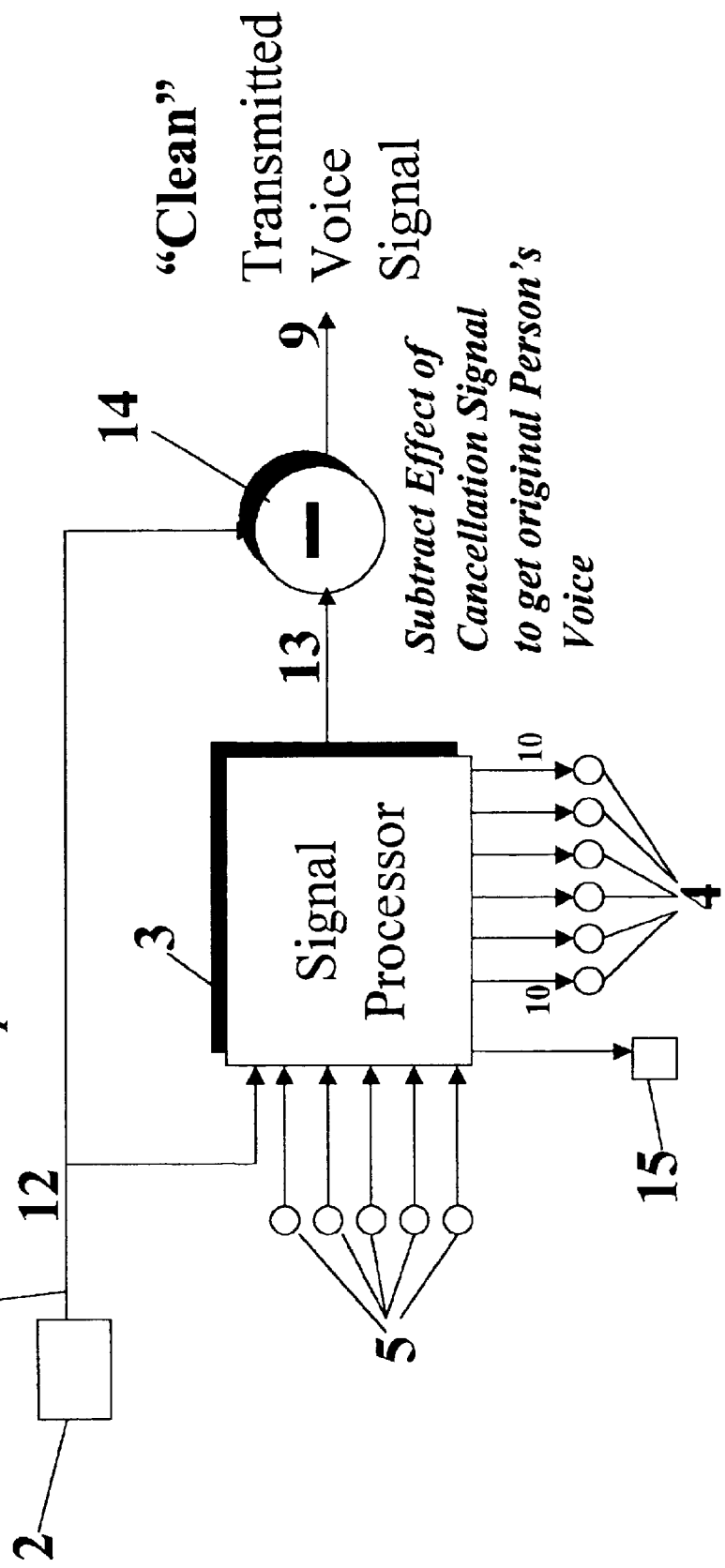
Figure 3  Subtract out Effects of Cancellation Signal

PHONE PRIVACY AND UNOBTRUSIVENESS VIA VOICE CANCELLATION

INTRODUCTION

1. Field of the Invention

This invention relates to voice transmission systems, and more particularly to voice transmission systems restricting the ambient area spatial dispersion of the voice.

2. Background of the Invention

Telephones are an essential part of modem societies. Privacy and noise issues related to phone usage have not been of great concern. However, as society now transitions from wired phones to wireless ones where phones are more and very often used in very public forums, these issues are of growing concern. Currently there is an exponential growth in the use of wireless phones. The use of phones, especially wireless or cell phones, in public forums results in:

Non-private phone calls—those people in close proximity can listen to your conversation; and Obtrusive or intrusive noise—A phone call being made in close proximity becomes undesired background noise; being forced to listen to another person's conversation due to the fact they're in close proximity to yourself Calls taken in public gatherings such as meetings, theaters, classrooms, churches and synagogues, museums, libraries, and restaurants, can be particularly intrusive.

PRIOR ART

Berger and Jones in U.S. Pat. No. 5,526,411 cancel the local broadcast of a person's voice by introducing a phase-inverted signal (the "negative" of the person's voice) via speakers in close proximity to the mouthpiece of the phone. Berger and Jones describe a voice transmission system incorporating active sound cancellation to reduce the radiated voice signal of the user: in essence they endeavor to provide conversation privacy through cancellation of the person's voice using active signal processing. As the person speaks, an inverted cancellation signal (a cancellation signal derived from the user voice signal) is applied to a configuration of nearby (close to the person's mouth) actuators (i.e. speakers). This cancellation signal is intended to reduce the radiated far-field signal of the person voice: in essence providing privacy in possibly public scenarios, as an example.

A problem with their design is that the cancellation signal corrupts the transmitted signal being sent over the telephone infrastructure. In other words as the person speaks his or her voice signal will be transmitted to the caller on the other end of the phone, though "corrupted" by the cancellation sound being emitted from the actuators (i.e. speakers) and picked up by the telephone.

Another problem with their design is uniformity of non-obtrusiveness. Radiation of the person's voice pattern is omnidirectional (i.e. traveling in all directions) and the voice signal will have varying characteristics such as magnitude and phase depending on the geophysical position relative to the source signal. In other words the person's voice will appear different standing behind the person verses standing in front of them.

Berger and Jones also claimed that their system will provide the user with "complete privacy". While in theory this may or may not be completely true, in practice active noise cancellation will reduce the target noise source, however usually not totally eliminate it. The patent alludes to the fact that it's a timing issue in regards to transmitting the voice signal over the telephone circuit. It's not as simple as transmitting the voice signal over the telephone circuit before being used for cancellation. The effect of the cancellation signal itself needs to be accounted for in the transmission path.

In the Berger patent, the same cancellation signal is sent to all of their speakers. In view of the directionality of voice, this leads to improper cancellation.

SUMMARY OF THE INVENTION

Accordingly, it is an object of the invention to provide a "clean" voice transmission signal, that is an "uncorrupted" signal, in the transmission line of a telephone system having a spatial sound cancellation feature.

A further object of the invention is to alleviate privacy and noise issues more effectively in voice transmission systems.

Another object of the invention is to provide apparatus which can be an external attachment to the phone or incorporated within a phone handset itself.

The objects of the invention are achieved by the use of a signal processor which too receives the "corrupted" voice signal and removes from the transmission line the electrical signal component generated by the microphone in the telephone mouthpiece in response to a voice cancellation sound emanating from actuators or speakers spherically-disposed about the microphone. This action by the signal processor may be enhanced by sensors spherically-disposed at a greater distance than the speakers about the microphone.

Thus the device and method enables the transmission of a "clean" voice signal while accommodating the alleviation of the privacy and noise issues.

Also the device and method more effectively deals with the privacy and noise issues. They do this by reducing more precisely the radiated speech pattern emanating from the person using the phone. The device, in a retrofit design, attaches to the base of the phone in close proximity to the telephone mouthpiece. It consists of spherical configurations of arrays of actuators and sensors approximately four inches from the base of the phone, and of a signal processing unit attached to the arrays or incorporated into the phone itself The actuators cancel the speech pattern emanating away from the phone. The signal processor and the spherically-arranged far-field sensors precisely guide the spherically-arranged actuators or speakers. The device can be integrated into new phones.

BRIEF DESCRIPTION OF DRAWINGS OF A PREFERRED EMBODIMENT OF THE MENTION

These and other objects, features, and advantages of the invention will become apparent from a reading of the following description of a preferred embodiment of the invention, when considered with the attached drawings wherein:

FIG. 1 is a diagram outlining a system incorporating the invention;

FIG. 2 is a diagram outlining a telephone system physical components in a user context, and showing a preferred embodiment of the associated voice input and far-afield sensors and cancellation actuators (speakers) in relation to the user and the phone; and FIG. 3 is a logic diagram showing how the cancellation signal is subtracted from the voice signal to be transmitted to the other party, by the signal processor which outputs also to the cancellation actuators after receiving not only the "corrupted" voice signal from the phone microphone but also inputs from the far-afield sensors.

DETAILED DESCRIPTION OF A PREFERRED EMBODIMENT OF THE INVENTION

Referring now particularly to FIG. 1 of the drawings, there is shown therein a voice cancellation system 1 which interfaces with a voice transmission system 8. The voice transmission system 8 may be a wired or wireless phone or other voice or sound transmission mechanism. The voice cancellation system 1 includes input sensor(s) (microphone) 2, a signal processor 3, an array of cancellation actuators or speakers 4, and an array of far-field sensors 5. While FIG. 1 shows components at a conceptual level, the actual physical hardware arrangement may vary, given that technology often incorporates or integrates functionality within single Integrated Circuitry (IC) chips.

However the arrays of speakers 4 and far-field sensors 5 are intended to indicate the need for multiple speakers and sensors in spherical configurations. They may or may not be actually disjoint in physical layout. The far-field sensors 5, commonly referred to as error sensors in the signal-processing field, could be microphones or any other sensing devices. Real Time adaptive signal processing algorithms 3 which generate cancellation signals based on input sensors and far-field sensors, are well documented in the field. Hardware as well as software solutions that implement these algorithms are commonly available.

The voice signal 7 includes the person's original voice, some form of the speaker 4 output from cancellation signal 10, and any background noise. For example, when a person's voice is recorded by way of a common microphone, the resulting recording includes the person's voice as well as all the background noise.

The voice cancellation system could also include a background noise cancellation component (not shown in FIG. 1) which could function to reduce the background noise which is transmitted along with the person's voice. The adaptive signal processing algorithms used for cancellation of background noise are very similar to those used for voice cancellation herein defined and are likewise well documented.

One possible implementation of the signal processing is defined by the flow diagram of Berger and Jones in U.S. Pat. No. 5,526,421. But there are a whole host of possible processing methodologies that could be used, including pure analog processing rather than the digital signal processing defined in patent U.S. Pat. No. 5,526,421. As previously mentioned numerous algorithms and methodologies exist and are well documented that effectuate cancellation signals given input sensor data.

As Berger and Jones mention in U.S. Pat. No. 5,526,421 much of the activity in the adaptive signal cancellation field has centered around cancellation of background noise. For example such systems have been used in the automobile industry to make the internal cabin quieter by canceling the external road noise. These adaptive algorithms have and continue to be used in cancellation of source signals as well: for example, in reducing the emanated noise from a military helicopter to make it less detectable by opposing forces.

Signal processing and adaptive cancellation has been around for years and the associated mathematical algorithms are well documented and used in quite a few products in industry today. Where once a system such as the one described here would have required custom hardware and would have been too big to commercially sell, today technology exists which makes this novel concept feasible and marketable.

In today's technology:
Noise cancellation algorithms exist—output can be even more than just an inversion of input signal;
Actuators (speakers) exist;
Sensors exist;
Processor speeds are sufficient, particularly if the algorithm is simple as in inversions; dedicated devices could be used if very complex algorithms are needed in particular situations. And processor speeds are ever increasing.

The voice cancellation system 1 is also shown for convenience as including, but not necessarily so logically or physically, a modulator 14 to which the detected voice signal is also fed. It should be noted that the transmitted voice signal is partially derived from the signal processor 3, and not exclusively from the detected voice signal 7, being the detected voice signal as cleaned by the signal processor 3 via the modulator 14.

FIG. 2 shows a preferred embodiment of the actual physical layout of the input voice sensors 2, of the far-field sensors 5, and of the cancellation sources (actuators or speakers) 4, in relation to a person's head 6 and associated phone. The configuration of the sensors 2 and 5 and actuators or speakers 4 is important. The input voice sensor 2 must be located in close proximity to the person's actual mouth. The cancellation actuators or speakers 4 form a spherical array pattern about the person's mouth and are at a greater distance from the mouth than the voice sensor 2. These actuators 4, which may be miniature speakers, cancel the person's voice in the space extending away from the phone mouthpiece where the input vice sensor 2 is located.

The far-field sensors 5 are situated spherically about the mouthpiece but at a farther distance from the mouthpiece than the actuators or speakers 4. They serve to detect how well the cancellation actuators or speakers 4 worked, and to feed back error signals to the signal processor 3. For example, if a large error is detected at a far-field sensor, then the corresponding actuator in the area may need to emit a larger cancellation signal.

A person's voice will be greatly reduced in the vicinity of his or her mouth by the system Thus he or she will not be able to hear their own voice as they normally would. Part of how people talk is a reflection of how they hear their own voice.

Therefore, a representation of the person's voice is sent by the signal processor 3 to the phone receiver's speaker 15 so that the sound of his or her voice is emitted from the ear piece of the phone. Otherwise the person would instinctively raise his or her voice to compensate for the reduction in the heard sound of their own voice, negating privacy and raising intrusive noise.

FIG. 3 diagrammatically depicts how the voice input signal 12, which is "corrupted" output from the input sensor(s) 2, is used to generate the transmitted "clean" voice signal 9. As previously stated, from the signal 12 is subtracted some form of the cancellation signal 13 derived from the signal processing algorithm wherein the resulting output signal 9 is then transmitted out to the recipient person or other party.

As previously indicated, the input voice sensor(s) 2 detects the person's voice 7 which contains the true voice, the background noise, and some form of the cancellation signal Then the detected voice signal 12 is sent to the signal processor 3 and to the modulator 14. The signal processor mathematically combines the input signal 12 with the far-field signals 5, and outputs the voice cancellation signals 10 to the actuators or speakers 4. At the same time the signal processor 3 also sends a subtraction signal relevant to earlier voice cancellation signals, to the modulator 14 to remove representations of them from the transmitted voice signal 9 downstream of the modulator.

It will be appreciated that system 1 operates in real time to transmit a "clean" or "uncorrupted" voice signal 9 while effectuating conversation privacy to a user 6. Signal processor 3 output cleans the "corrupted" voice signal 12 by receiving the "corrupted" voice signal 12, and the output of far-field sensors 5. Other signal processor 3 outputs feed the actuators or speakers 4 to effect spatial voice cancellation, and the phone receiver speaker 15 to enable the user to properly hear his or her own voice.

It is important that the actuators or speakers 4 and the far-field sensors 5 be in a spherical array configuration about the mouthpiece microphone 2. The signal emitted from each speaker of the array will be tone and strength varying; e.g., the speakers directly in front of the person's mouth will emit a stronger signal than those lying behind and aside the person's head.

While applicants have shown and described a preferred embodiment of the invention, it will be apparent to those skilled in the art that other and different applications may be made of the principles of the invention. It is desired therefore to be limited only by the scope or spirit of the appended claims.

What is claimed is:

1. An electrical voice transmission system for transmitting an uncorrupted voice signal while effectuating conversational privacy to the user comprising:
    an electrical transmission line;
    a microphone for picking up the voice and delivering it to the transmission line;
    a modulator in said transmission line for subtracting from the transmission line downstream thereof any electrical voice cancellation sound signal picked up before by the microphone;
    a speaker near the microphone for providing a spatial voice cancellation sound, a signal processor receiving input from the transmission line before the modulator and providing output concurrently to the speaker to generate a voice cancellation sound and to the modulator to subtract from the transmission line downstream thereof the electrical voice cancellation sound signal picked up before by the microphone.

2. A voice transmission system according to claim 1, wherein the speaker is one of a set of speakers near the microphone for providing voice cancellation sounds.

3. A voice transmission system according to claim 2, wherein the set of speakers near the microphone for providing voice cancellation sound is arranged in a spherical pattern about the microphone and at a greater distance from the source of the voice than the microphone.

4. A voice transmission system according to claim 1, and a far-field sensor more remote from the microphone than the speaker for generating error signals and sending them to the signal processor.

5. A voice transmission system according to claim 4, wherein the far-field sensor is one of a set of far-field sensors more remote from the microphone than the speaker for generating error signals and sending them to the signal processor.

6. A voice transmission system according to claim 5, wherein the set of far-field sensors more remote from the microphone than the speaker for generating error signals and sending them to the signal processor is arranged in a spherical pattern about the microphone.

7. A voice transmission system according to claim 2, wherein the speaker is one of a set of speakers near the microphone for providing voice cancellation sounds, and a set of far-field sensors more remote from the microphone than the speakers for generating error signals and sending them to the signal processor.

8. A voice transmission system according to claim 2, wherein the set of speakers near the microphone for providing a voice cancellation sound is arranged in a spherical pattern about the microphone, and a set of far-field sensors more remote from the microphone than the speakers for generating error signals and sending them to the signal processor is arranged in a spherical pattern about the microphone.

9. A device for attachment to a telephone handset having a microphone to render the telephone capable of transmitting an uncorrupted signal while effectuating conversational privacy comprising:
    a modulator for insertion in a transmission line extending from said handset;
    a speaker for mounting near the microphone for providing a voice cancellation sound, a signal processor receiving input from the transmission line before the modulator and providing output concurrently to the speaker to generate a voice cancellation sound and to the modulator to subtract from the transmission line downstream thereof earlier electrical voice cancellation sound signal picked up by the microphone.

10. A device for attachment to a telephone handset having a microphone according to claim 9, wherein the speaker is one of a set of speakers mounted near the microphone for providing voice cancellation sounds.

11. A device for attachment to a telephone handset having a microphone according to claim 10, wherein the set of speakers mounted near the microphone for providing a voice cancellation sound is arranged in a spherical pattern about the microphone.

12. A device for attachment to a telephone handset having a microphone according to claim 9, and a far-field sensor for mounting more remote from the microphone than the speaker for generating error signals and sending them to the signal processor.

13. A device for attachment to a telephone handset having a microphone according to claim 12, wherein the far-field sensor is one of a set of far-field sensors for mounting more remote from the microphone than the speaker for generating error signals and sending them to the signal processor.

14. A device for attachment to a telephone handset having a microphone according to claim 13, wherein the set of far-field sensors for mounting more remote from the microphone than the speaker for generating error signals and sending them to the signal processor are arranged in a spherical pattern about the microphone.

15. A voice transmission system according to claim 1, and another speaker near the microphone and connected to the signal processor for delivering voice as it was spoken into the microphone for hearing by the voice source.

16. A voice transmission system according to claim 4, and another speaker near the microphone and connected to the signal processor for delivering voice as it was spoken into the microphone for hearing by the voice source.

17. A voice transmission system according to claim 8, and another speaker near the microphone and connected to the signal processor for delivering voice as it was spoken into the microphone for hearing by the voice source.

18. In a method for transmitting uncorrupted voice over an electrical transmission line while canceling it spatially comprising:

picking up the voice via a microphone and delivering it as an electrical signal to the transmission line;

operating a modulator in said transmission line;

inputing the signal from the transmission line before the modulator into a signal processor and providing outputs concurrently therefrom to a speaker near the microphone to generate a voice cancellation sound which too is picked up by the microphone and delivered as an electrical signal to the transmission line before the modulator and to the modulator to enable it to subtract from the transmission line downstream from the modulator electrical voice cancellation sound signal picked up by the microphone.

19. In a method for transmitting voice over an electrical transmission line while canceling it spatially according to claim 18, and providing omnidirectional voice cancellation sound from a set of speakers of which said speaker is just one near the microphone and arranged in a spherical pattern about the microphone, and generating error signals and sending them to the signal processor from a set of far-field sensors more remote from the microphone than the speakers and arranged in a spherical pattern about the microphone.

20. In a method for transmitting voice over an electrical transmission line while canceling it spatially according to claim 19, and delivering voice as it was spoken into the microphone for hearing by the voice source from another speaker near the microphone and that is connected to the signal processor.

* * * * *